United States Patent [19]
Shpiro et al.

[11] Patent Number: 5,487,671
[45] Date of Patent: Jan. 30, 1996

[54] COMPUTERIZED SYSTEM FOR TEACHING SPEECH

[75] Inventors: Zeev Shpiro, Tel Aviv, Israel; Gabriel F. Groner, Palo Alto, Calif.; Erik Ordentlich, Huntingdon Valley, Pa.

[73] Assignee: DSP Solutions (International), Hamilton, Bermuda

[21] Appl. No.: 7,242

[22] Filed: Jan. 21, 1993

[51] Int. Cl.⁶ .................................................. G09B 5/00
[52] U.S. Cl. ................................ 434/185; 364/419.01
[58] Field of Search ................................. 434/185, 156, 434/157, 167, 169; 364/419.01, 419.02, 419.03

[56] References Cited

U.S. PATENT DOCUMENTS

| | | | |
|---|---|---|---|
| 4,615,680 | 10/1986 | Tomatis | 434/185 X |
| 4,641,343 | 2/1987 | Holland et al. | 434/185 X |

FOREIGN PATENT DOCUMENTS

| | | | |
|---|---|---|---|
| 9100582 | 1/1991 | WIPO | 434/185 |

OTHER PUBLICATIONS

L. R. Rabiner, Levison, S. E. and Sondhi, M. M., "On the Application of Vector Quantization and Hidden Markov Models to Speaker–Indepandent, Isolated Word Recognition", Bell Systems Tech J, vol. 62(4), Apr. 1983, pp. 1075–1105.

L. R. Rabiner and M. R. Sambur, "An Algorithm for Determining the Endpoints of Isolated Utterances", Bell System Tech J. Feb. 1975, vol. 54, No. 2.

L. R. Rabiner and J. G. Wilpon, "A Simplified, Robust Training Procedure for Speaker Trained, Isolated Word Recognition System" J. Acoustical Society of America, Nov. 1980.

F. Itakura, "Minimum Prediction Residual Principle Applied to Speech Recognition", IEEE Trans. Acoustics, Speech and Signal Processing, Feb. 1975.

J. Le Roux and C. Gueguen, "A fixed Point Computation of Partial Correlation Coefficient", IEEE ASSP, Jun., 1977.

Flanagan, J. L. "Computers that talk and listen: Manmachine Communication by Voice", Proc IEEE, vol. 64, 976, pp. 405–415.

Peacocke, R. D. and Graf, D. H., "An Introduction to Speech and Speaker Recognition", IEEE Computer, vol. 23(8), Aug. 1990, pp. 26–33.

L. R. Rabiner et al, "Speaker–Independent Recognition of Isolated Words Using Clustering Techniques", IEEE Trans. Acoustics, Speech and Signal Processing, vol. ASSP-27, No. 4.

*Primary Examiner*—Richard J. Apley
*Assistant Examiner*—Glenn E. Richman
*Attorney, Agent, or Firm*—Ladas & Parry

[57] ABSTRACT

Apparatus for interactive speech training having an audio specimen generator for playing a pre-recorded reference audio specimen to a user for attempted repetition by the user and a reference audio specimen library in which reference audio specimens are stored and to which the audio specimen generator has access. The audio specimen library contains a multiplicity of recordings of speaker dependent audio specimens produced by a plurality of speech models. A speaker independent parameter database stores a plurality of speaker independent references which are different from the reference audio specimens stored in the reference audio specimen library. The speaker independent references are classified according to at least one of age, gender or dialect, but is independent of other speaker characteristics within each category. An audio specimen scorer scores a user's repetition audio specimen by comparison of at least one parameter of the user's repetition audio specimen with a speaker independent reference.

26 Claims, 12 Drawing Sheets

COMPUTERIZED SYSTEM FOR TEACHING SPEECH

FIELD OF THE INVENTION

The present invention relates to educational systems generally and more particularly to computerized systems for teaching speech.

BACKGROUND OF THE INVENTION

In recent years there have been developments in the art of computerized teaching of speech. Speech laboratories in which prompts and cues such as pre-recorded sounds and words are presented to a student and the students' speech productions are recorded or monitored are well known.

The Speech Viewer II, marketed by IBM, is a speech therapy product which provides visual and auditory feedback from a student's sound productions.

Known methods and apparatus for computerized speech recognition are described in the following publications, the disclosures of which are incorporated herein by reference:

Flanagan, J. L. "Computers that talk and listen: Man machine communication by voice", Proc IEEE, Vol. 64, 1976, pp. 405–415;

Itakura, F. "Minimum prediction residual principle applied to speech recognition", IEEE Trans. Acoustics, Speech and Signal Processing, February, 1975–describes a temporal alignment algorithm and a method for computing a distance metric;

Le Roux, J. and Gueguen, C. "A fixed point computation of partial correlation coefficients", IEEE ASSP, June, 1977;

Peacocke, R. D. and Graf, D. H, "An introduction to speech and speaker recognition", IEEE Computer, Vol. 23(8), August, 1990, pp. 26–33;

L. R. Rabiner et al, "Speaker-independent recognition of isolated words using clustering techniques" IEEE Trans Acoustics, Speech and Signal Processing, Vol. ASSP-27, No. 4, August, 1979, pp. 336–349;

L. R. Rabiner, Levison, S.E. and Sondhi, M. M., "On the application of vector quantization and hidden Markov models to speaker-independent, isolated word recognition", Bell Systems Tech J, Vol. 62(4), April, 1983, pp. 1075–1105;

L. R. Rabiner, and Sambur, M.R., "An algorithm for determining the endpoints of isolated utterances", Bell Systems Tech J, February, 1975;

L. R. Rabiner, and Wilpon, J. G., "A simplified, robust training procedure for speaker trained isolated word recognition systems" J Acoustical Society of America, November, 1980.

The disclosures of all the above publications are incorporated herein by reference.

SUMMARY OF THE INVENTION

The present invention seeks to provide an improved computerized system for speech and pronunciation teaching in which recorded reference speech specimens are presented to a student and in which a quantification of the similarity between the student's repetitions and the originally presented reference speech specimens is displayed to the user.

The present invention also seeks to provide a speech and pronunciation teaching system which is particularly suited for independent speech study and does not require presence of a trained human speech and pronunciation expert. Preferably, the system of the present invention includes verbal prompts which guide a user through a teaching system without requiring recourse to a human teacher. Preferably, student performance is monitored and the verbal prompt sequence branches to take student performance into account. For example, predetermined types of student errors, such as repeatedly mispronouncing a particular phoneme, may be extracted from student speech responses and the verbal prompt sequence may branch to take into account the presence or absence of each type of student error.

The present invention also seeks to provide a speech and pronunciation teaching system which is particularly suited to teaching preferred pronunciation of a foreign language to a speaker of a native language. Preferably, the system of the present invention includes an initial menu presented in a plurality of languages and a multi-language message prompting the user to select the menu option representing his native language. In response to the user's selection of a native language, the system is preferably operative to present subsequent verbal messages to the user in his own native language, and/or to branch the sequence of verbal messages so as to take into account speech characteristics, such as pronunciation errors, which are known to occur frequently in speakers of the user's native language. For example, when speaking English, native speakers of Japanese typically confuse the L and R sounds, and also the short I and long E sounds, as in the words "ship" and "sheep". Native speakers of Arabic and German do not have either of these problems. There is thus provided, in accordance with a preferred embodiment of the present invention, apparatus for interactive speech training including an audio specimen generator for playing a pre-recorded reference audio specimen to a user for attempted repetition thereby, and an audio specimen scorer for scoring a user's repetition audio specimen.

Further in accordance with a preferred embodiment of the present invention the audio specimen scorer includes a reference-to-response comparing unit for comparing at least one feature of a user's repetition audio specimen to at least one feature of the reference audio specimen, and a similarity indicator for providing an output indication of the degree of similarity between at least one feature of the repetition audio specimen and at least one feature of the reference audio specimen.

Still further in accordance with a preferred embodiment of the present invention, the apparatus also includes a user response memory to which the reference-to-response comparing unit has access, for storing a user's repetition of a reference audio specimen.

Additionally in accordance with a preferred embodiment of the present invention, the reference-to-response comparing unit includes a volume/duration normalizer for normalizing the volume and duration of the reference and repetition audio specimens.

Still further in accordance with a preferred embodiment of the present invention, the reference-to-response comparing unit includes a parameterization unit for extracting audio signal parameters from the reference and repetition audio specimens.

Additionally in accordance with a preferred embodiment of the present invention, the reference-to-response comparing unit also includes apparatus for comparing the reference audio specimen parameters to the repetition audio specimen parameters.

Further in accordance with a preferred embodiment of the present invention, the apparatus for comparing includes a parameter score generator for providing a score representing the degree of similarity between the audio signal parameters of the reference and repetition audio specimens.

Still further in accordance with a preferred embodiment of the present invention, the output indication includes a display of the score.

In accordance with one alternative embodiment of the present invention, the output indication includes a display of at least one audio waveform.

Further in accordance with a preferred embodiment of the present invention, the interactive speech training apparatus includes a prompt sequencer operative to generate a sequence of prompts to a user.

Still further in accordance with a preferred embodiment of the present invention, the interactive speech training apparatus also includes a reference audio specimen library in which reference audio specimens are stored and to which the audio specimen generator has access.

Additionally in accordance with a preferred embodiment of the present invention, the reference audio specimen library includes a multiplicity of recordings of audio specimens produced by a plurality of speech models.

Still further in accordance with a preferred embodiment of the present invention, the plurality of speech models differ from one another in at least one of the following characteristics: sex, age, and dialect.

There is also provided in accordance with another preferred embodiment of the present invention, apparatus for interactive speech training including a prompt sequencer operative to generate a sequence of prompts to a user, prompting the user to produce a corresponding sequence of audio specimens, and a reference-to-response comparing unit for comparing at least one feature of each of the sequence of audio specimens generated by the user, to a reference.

Further in accordance with a preferred embodiment of the present invention, the reference to which an individual user-generated audio specimen is compared includes a corresponding stored reference audio specimen.

Still further in accordance with a preferred embodiment of the present invention, the sequence of prompts branches in response to user performance.

Additionally in accordance with a preferred embodiment of the present invention, the sequence of prompts is at least partly determined by a user's designation of his native language.

Still further in accordance with a preferred embodiment of the present invention, the prompt sequencer includes a multilanguage prompt sequence library in which a plurality of prompt sequences in a plurality of languages is stored and wherein the prompt sequencer is operative to generate a sequence of prompts in an individual one of the plurality of languages in response to a user's designation of the individual language as his native language.

There is also provided, in accordance with another preferred embodiment of the present invention, apparatus for interactive speech training including an audio specimen recorder for recording audio specimens generated by a user, and a reference-to-response comparing unit for comparing at least one feature of a user-generated audio specimen to a reference, the comparing unit including an audio specimen segmenter for segmenting a user-generated audio specimen into a plurality of segments, and a segment comparing unit for comparing at least one feature of at least one of the plurality of segments to a reference.

Still further in accordance with a preferred embodiment of the present invention, the audio specimen segmenter includes a phonetic segmenter for segmenting a user-generated audio specimen into a plurality of phonetic segments.

Additionally in accordance with a preferred embodiment of the present invention, at least one of the phonetic segments includes a phoneme such as a vowel or consonant.

In accordance with one alternative embodiment of the present invention, at least one of the phonetic segments may include a syllable.

There is also provided in accordance with yet a further preferred embodiment of the present invention, apparatus for interactive speech training including an audio specimen recorder for recording audio specimens generated by a user, and a speaker-independent audio specimen scorer for scoring a user-generated audio specimen based on at least one speaker-independent parameter.

Further in accordance with a preferred embodiment of the present invention, at least one speaker-independent parameter includes a threshold value for the amount of energy at a predetermined frequency.

Still further in accordance with a preferred embodiment of the present invention, the apparatus also includes a conventional personal computer.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
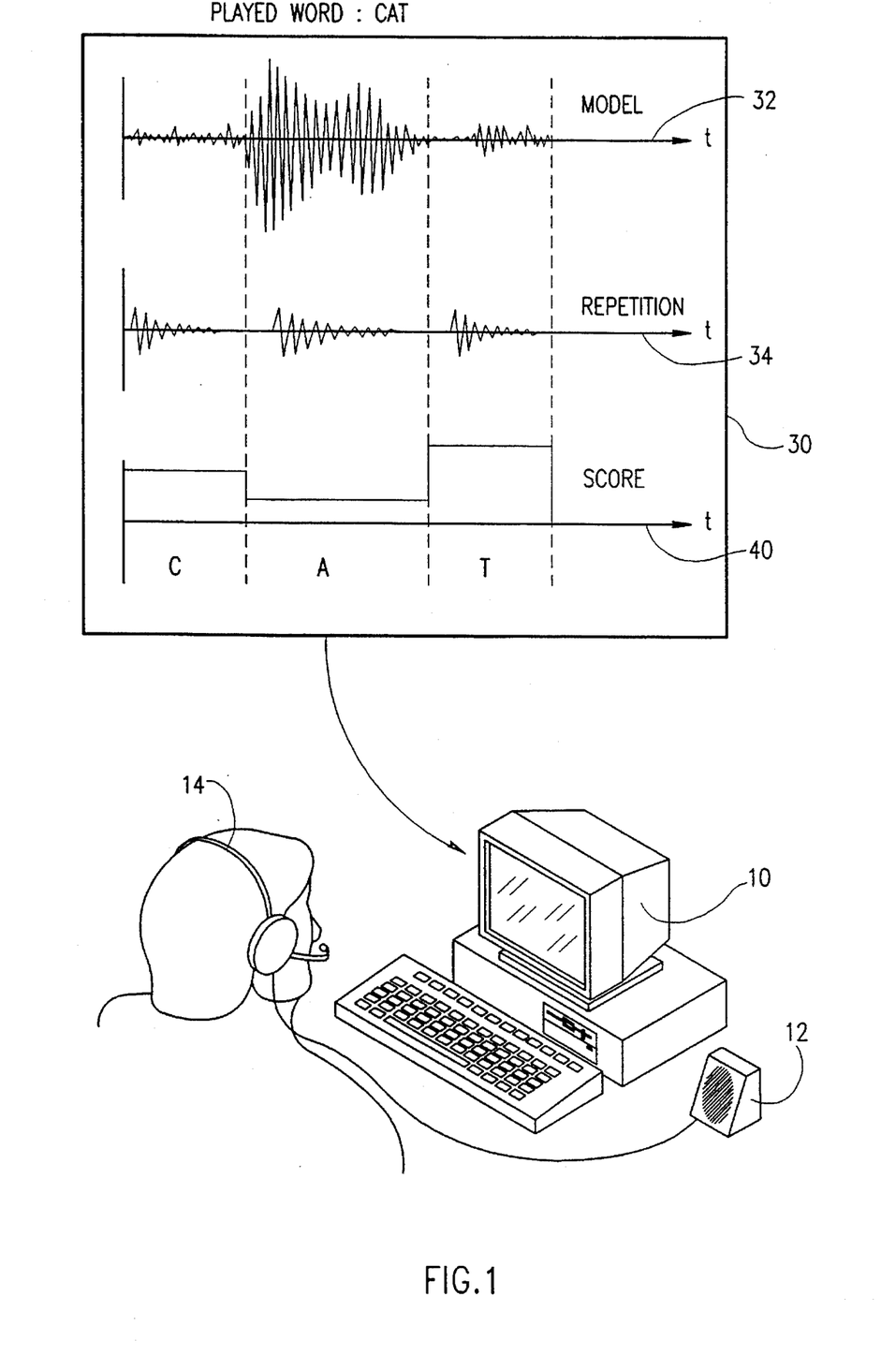
FIG. 1 is a generalized pictorial illustration of an interactive speech teaching system constructed and operative in accordance with preferred embodiment of the present invention.
Figure 2:
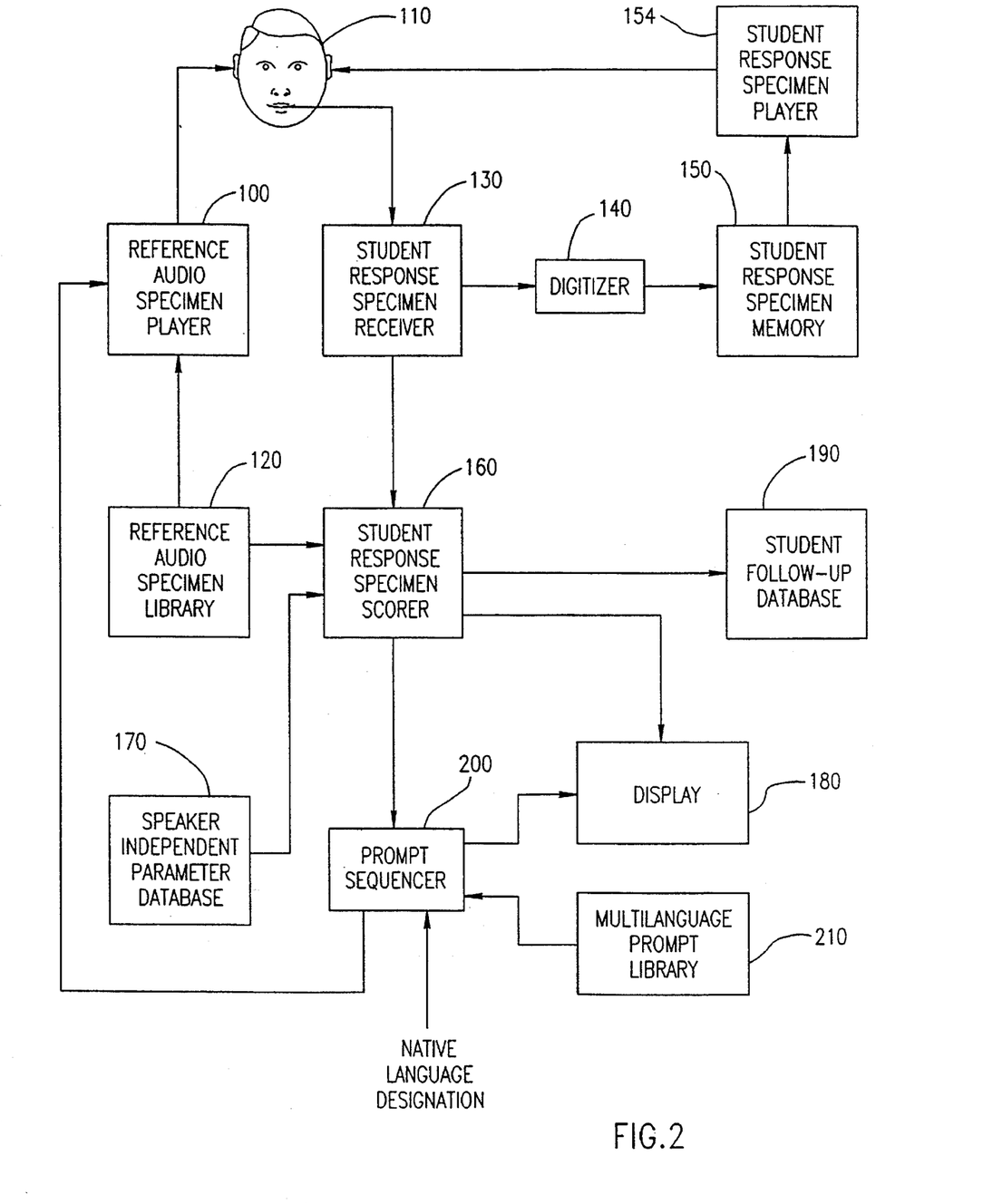
FIG. 2 is a simplified block diagram illustration of the system of FIG. 1.

Reference is now made to FIGS. 1 and 2 which illustrate an interactive speech teaching system constructed and operative in accordance with a preferred embodiment of the present invention. The system of FIGS. 1 and 2 is preferably based on a conventional personal computer 10, such as an IBM PC-AT, preferably equipped with an auxiliary audio module 12. For example, a suitable audio module 12 is the DS201, manufactured by Digispeech Inc. of Palo Alto, CA, USA and commercially available from IBM Educational Systems. A headset 14 is preferably associated with audio module 12.

As may be seen from FIG. 1 a display 30 is optionally provided which represents normalized audio waveforms of both a pre-recorded reference audio specimen 32 and a student's attempted repetition 34 thereof. A score 40, quantifying the similarity over time between the repetition and reference audio specimens, is typically displayed, in order to provide feedback to the student.

Any suitable method may be employed to generate the similarity score 40, such as conventional correlation methods. One suitable method is described in the above-referenced article by Itakura, the disclosure of which is incorporated herein by reference. To use the distance metric described by Itakura, first linear prediction coefficients are extracted from the speech signal. Then a dynamic programming algorithm is employed to compute the distance between a student's repetition and a set of models, i.e., the extent to which the student's repetitions corresponds to the models.

Preferably, appropriate software is loaded in computer 10 of FIG. 1 to carry out the operations set forth in the functional block diagram of FIG. 2. Alternatively, the structure of FIG. 2 may be embodied in a conventional hard-wired circuit.

Reference is now made specifically to the block diagram of FIG. 2. The apparatus of FIG. 2 comprises a reference audio specimen player 100 which is operative to play a reference audio specimen to a student 110. Reference audio specimens for each of a multiplicity of phonemes, words and/or phrases are typically prerecorded by each of a plurality of speech models and are stored in a reference audio specimen library 120. Reference audio specimen player 100 has access to reference audio specimen library 120.

The student 110 attempts to reproduce each reference audio specimen. His spoken attempts are received by student response specimen receiver 130 and are preferably digitized by a digitizer 140 and stored in a student response specimen memory 150. Optionally, each stored student response from memory 150 is played back to the student on a student response specimen player 154. Players 100 and 154 need not, of course, be separate elements and are shown as separate blocks merely for clarity.

A student response specimen scoring unit 160 is operative to evaluate the reference audio specimens by accessing student response specimen receiver 130. Scores are computed by comparing student responses to the corresponding reference audio specimen, accessed from library 120.

Evaluation of student responses in terms of a reference specimen sometimes gives less than optimal results because a single reference specimen produced by a single speech model may not accurately represent the optimal pronunciation of that specimen. Therefore, alternatively or in addition, student response scores may be computed by evaluating student responses in terms of a speaker independent reference such as a set of speaker independent parameters stored in a speaker independent parameter database 170. According to a preferred embodiment of the present invention, the speaker independent parameters in database 170 are specific as to age, gender and/or dialect of the speaker. In other words, the parameters are speaker independent within each individual category of individuals of a particular age, gender and/or dialect.

One example of a speaker independent parameter is the presence of high energy at a particular frequency which depends on the audio specimen. For example, in FIG. 6, the CAT waveform includes first and third high frequency, low energy portions and a second portion interposed between the first and third portions which is characterized by medium frequency and high energy. The first and third portions correspond to the card and sounds in CAT. The second portion corresponds to the A sound.

Frequency analysis may be employed to evaluate the response specimen.

Speaker dependent parameters such as resonant frequencies or linear predictor coefficients may be computed, and the computed values may be compared with known normal ranges therefore.

Student response specimen scoring unit 160 is described in more detail below with reference to FIG. 3.

The student response score or evaluation derived by scorer unit 160 is displayed to the student on a display 180 such as a television screen. Preferably, the score or evaluation is also stored in a student follow-up database 190 which accumulates information regarding the progress of each individual student for follow-up purposes.

The interface of the system with the student is preferably mediated by a prompt sequencer 200 which is operative to generate prompts to the student, such as verbal prompts, which may either be displayed on display 180 or may be audibly presented to the student. Preferably, the prompt sequencer receives student scores from scoring unit 160 and is operative to branch the sequence of prompts and presented reference audio specimens to correspond to the student's progress as evidenced by his scores.

According to a preferred embodiment of the present invention, the prompt sequencer initially presents the student with a menu via which a student may designate his native language. The prompt sequencer preferably takes the student's native language designation into account in at least one of the following ways:

(a) Verbal prompts are supplied to the user in his native language. Each prompt is stored in each of a plurality of native languages supported by the system, in a multilanguage prompt library 210 to which prompt sequencer 200 has access.

(b) The sequence of prompts and reference audio specimens is partially determined by the native language designation. For example, native speakers of Hebrew generally have difficulty in pronouncing the English R sound. Therefore, for Hebrew speakers, the sequence of prompts and reference audio specimens might include substantial drilling of the R sound.

Figure 3:
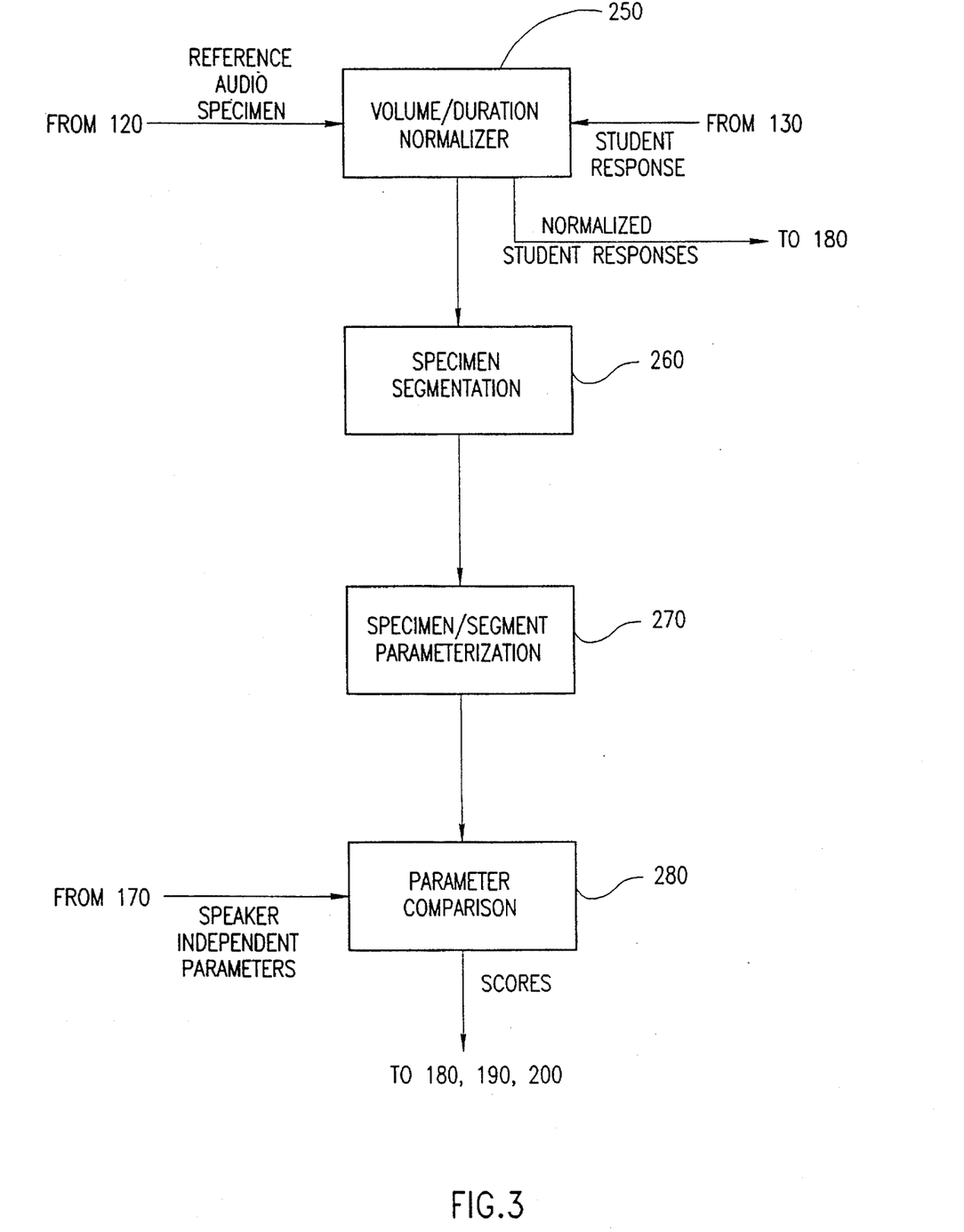
FIG. 3 is a simplified block diagram illustration of one of the components of the system of FIG. 1.

Reference is now made to FIG. 3 which is a simplified block diagram of a preferred implementation of student specimen scorer 160 of FIG. 2.

As explained above, scoring unit 160 receives student response specimens as input, either directly from student response specimen receiver 130 or indirectly, via student response specimen memory 150. The volume and duration of the responses are preferably normalized by a volume/duration normalizer unit 250, using conventional methods. If the linear predictive coding method of parameter extraction described herein is employed, volume normalization is not necessary because volume is separated from the other parameters during parameter extraction.

Duration may be normalized using the time warping method described in the above-referenced article by Itakura.

A segmentation unit 260 segments each response specimen, if it is desired to analyze only a portion of a response specimen, or if it is desired to separately analyze a plurality of portions of the response specimen. Each segment or portion may comprise a phonetic unit such as a syllable or phoneme. For example, the consonants C and T may be stripped from a student's utterance of the word CAT, in order to allow the phoneme A to be separately analyzed. Alternatively, each segment or portion may comprise a time unit. If short, fixed length segments are employed, duration normalization is not necessary.

To segment a response specimen, the silence-speech boundary is first identified as the point at which the energy increases to several times the background level and remains high. Any suitable technique may be employed to identify the silence-speech boundary, such as that described in the above-referenced article by Rabiner and Sambur, the disclosure of which is incorporated herein by reference.

Next, consonant-vowel boundaries are identified by identifying points at which the energy remains high but the dominant speech frequency decreases to a range of about 100 to 200 Hz. The dominant frequency may be measured by a zero crossing counter which is operative to count the number of times in which the waveform crosses the horizontal axis.

Alternatively, specimen segmentation unit 260 may be bypassed or eliminated and each response specimen may be analyzed in its entirety as a single unit.

A parameter comparison unit 280 is operative to score student responses by evaluating the student responses in terms of speaker independent parameters stored in speaker independent parameter database 170 of FIG. 2. The score for an individual student response preferably represents the degree of similarity between the parameters derived from the individual student response by parameterization unit 270, and the corresponding speaker-independent parameters stored in database 170.

The system may, for example, compare the student's response specimen with a corresponding plurality of stored reference specimens, thereby to obtain a plurality of similarity values, and may use the highest of these similarity values, indicating the most similarity, as the score for the student's response.

The student response scores computed by parameter comparison unit 280 are preferably provided to each of the following units of FIG. 1:

(a) display 180, for display to the student. Alternatively, the student may be provided with an audio message indicating the score;

(b) student follow-up database 190, for storage; and (c) prompt sequencer 200, to enable the prompt sequencer to adapt the subsequent sequence of prompts and recorded reference audio specimens to the user's progress as evidenced by the scores.

Figure 4:
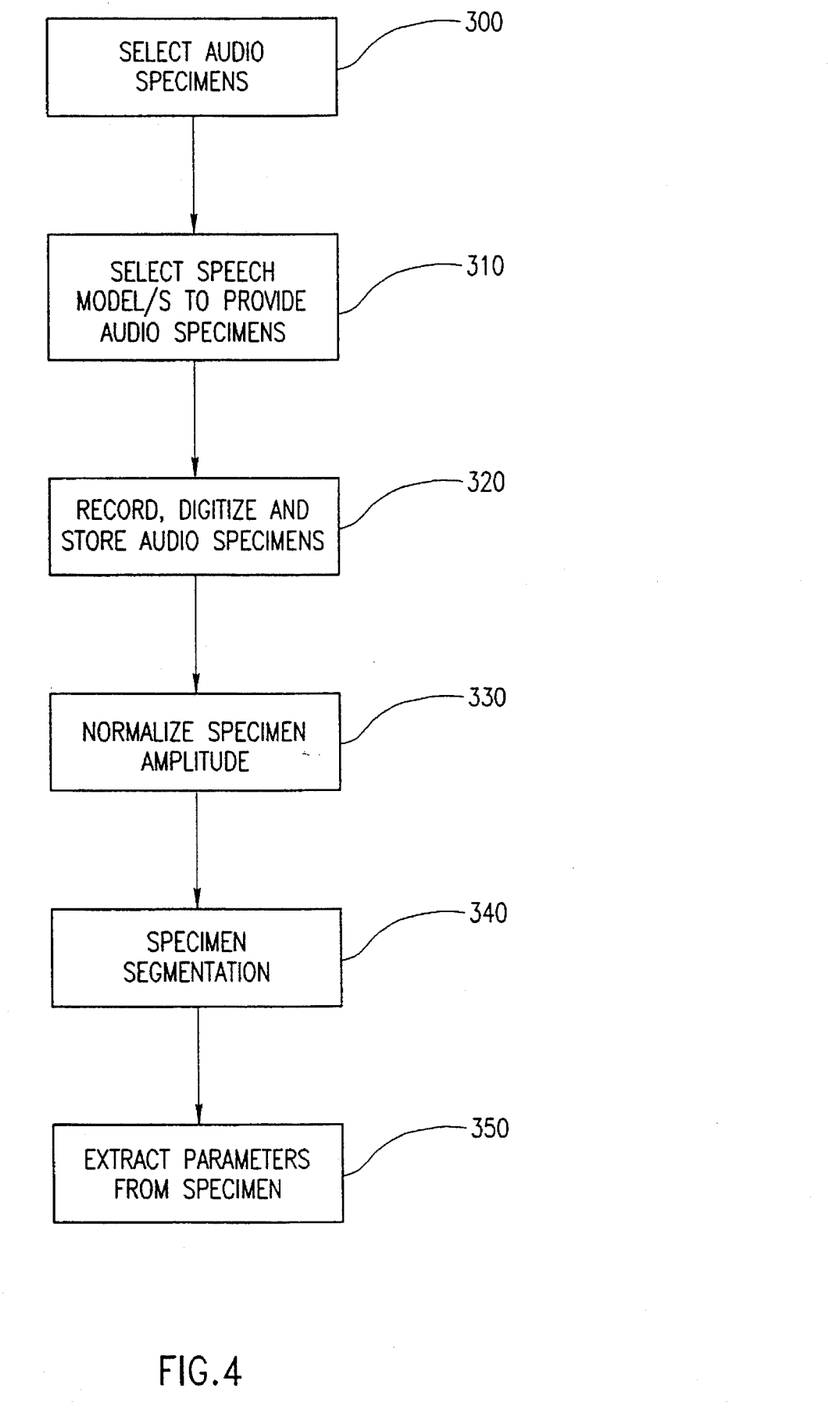
FIG. 4 is a simplified flow chart illustrating preparation of pre-recorded material for use in the invention.

A preferred method for preparation, during system setup, of pre-recorded material for storage in reference audio specimen library 120 is now described with reference to FIG. 4.

As explained above, during system set-up, a reference audio specimen is recorded for each word, phoneme or other speech unit to be learned. In step 300, a set of words, phonemes, phrases or other audio specimens is selected. Preferably, a plurality of speech models are employed so that a range of sexes, ages and regional or national dialects may be represented. For example, the plurality of speech models employed in a system designed to teach pronunciation of the English language may include the following six speech models:

Man - British dialect

Woman - British dialect

Child - British dialect

Man - American dialect

Woman - American dialect

Child - American dialect

In step 310, a plurality of speech models is selected. Each audio specimen selected in step 300 is produced by each of the speech models.

In step 320, each recorded audio specimen is recorded, digitized and stored in memory by the system.

In step 330, the amplitude of each recorded audio specimen is normalized.

In step 340, each recorded audio specimen is preferably divided into time segments or phonetic segments.

In step 350, each recorded audio specimen is characterized by extracting at least one parameter therefrom.

Figure 5A:
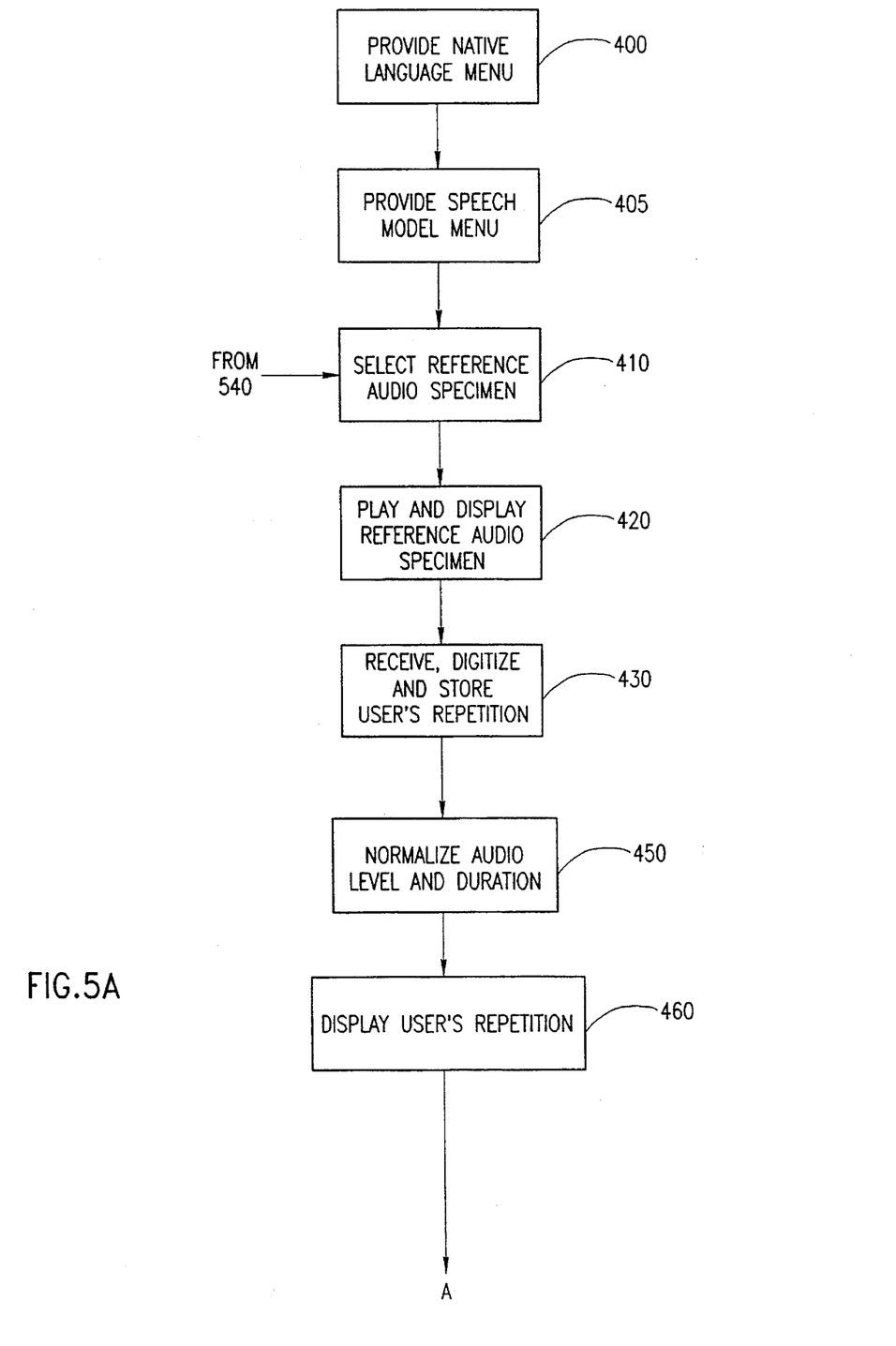
FIGS. 5A and 5B, taken together, are a simplified flow chart illustrating operation of the apparatus of FIGS. 1 and 2.
Figure 5B:
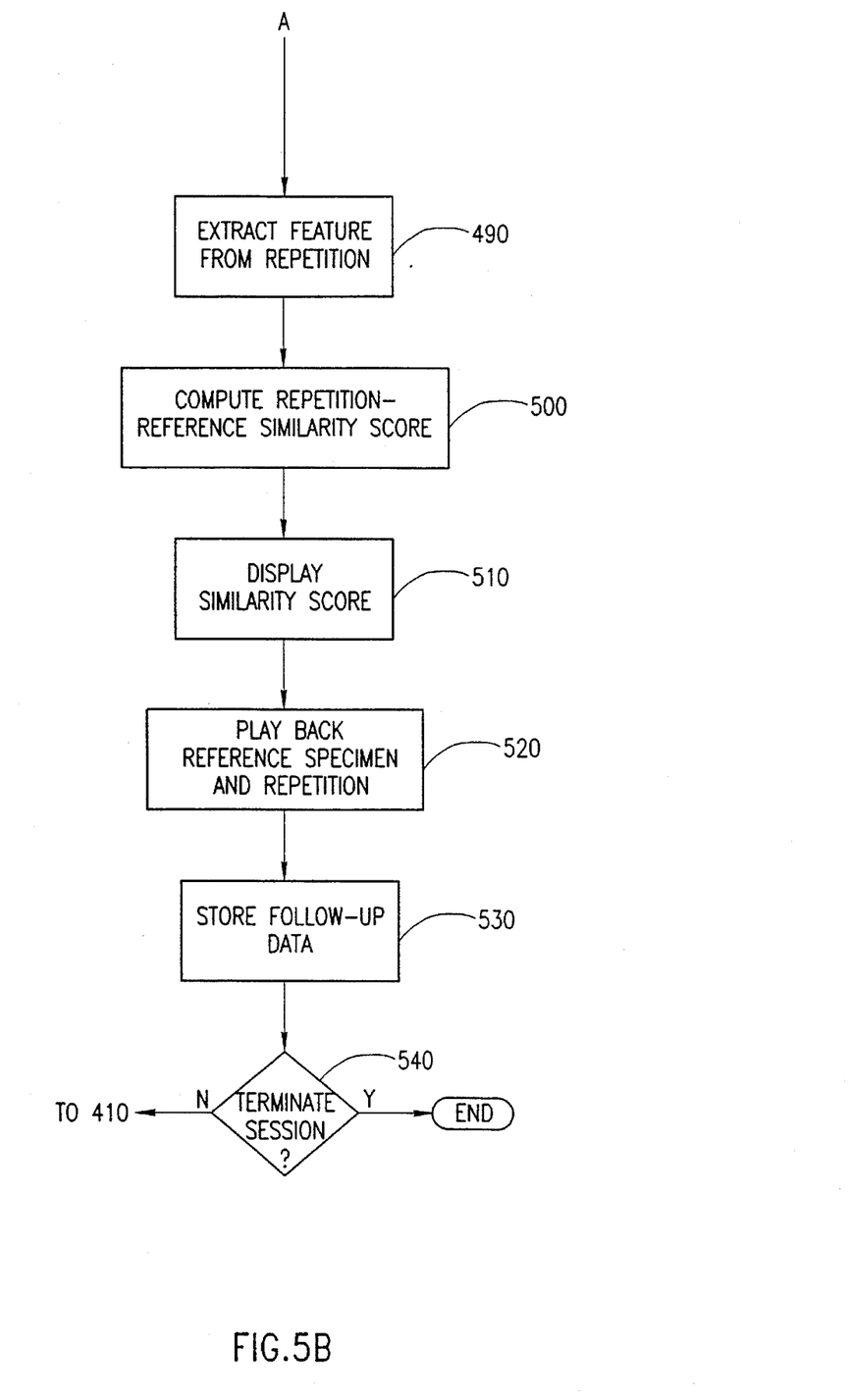

A typical user session, using the system of FIGS. 1–3, is now described with reference to the flowchart of FIGS. 5A–5B.

In step 400, the user is provided with a menu of languages and is prompted to designate his native language. Alternatively, the user may be prompted to speak a few words in his native language and the system may be operative to analyze the spoken words and to identify the native language.

In step 405, the user is provided with a speech model menu whose options correspond to the plurality of speech models described above, and is prompted to select the speech model most suitable for him.

In step 410, the user is prompted to select an initial reference audio specimen, such as a phoneme, word or phrase, to be practiced. Alternatively, the specimen to be practiced may be selected by the system, preferably partially in accordance with the user's designation of his native language in step 400.

Step 420–The reference audio specimen is played to the user and, optionally, the waveform thereof is simultaneously displayed to the user.

Step 430–The user's attempted repetition of the reference audio specimen is received, digitized and stored in memory by the system.

Step 450–The system normalizes the audio level and duration of the repetition audio specimen.

Step 460–Optionally, the repetition audio specimen is replayed and the normalized waveform of the repetition audio specimen is displayed to the user.

Step 490–The system extracts audio features such as linear predictor coefficients from the repetition audio specimen by parameterization of the specimen. Suitable audio feature extraction methods are described in the above-referenced article by Itakura and in the references cited therein, the disclosures of which are incorporated herein by reference.

Step 500–The system compares the parameters extracted in step 490 to stored features of the reference audio specimen and computes a similarity score.

Step 510–The system displays the similarity score.

Step 520–Preferably, the system plays back the reference and repetition specimens for audio comparison by the user.

Step 530–Optionally, the system stores the similarity score and/or the repetition specimen itself for later follow-up.

Step 540–Unless the system or the student determine that the session is to terminate, the system returns to step 410. Preferably, system choices of reference specimens take into account student performance. For example, if the similarity score for a particular reference audio specimen is low, indicating poor user performance, the reference audio specimen may be repeated until a minimum level of performance is obtained. Subsequently, a similar reference audio specimen may be employed to ensure that the level of performance obtained generalizes to similar speech tasks.

For example, if the user experiences difficulty in reproducing A in CAT, the specimen CAT may be repeatedly presented and may be followed by other specimens including A, such as BAD.

FIGS. 6–11 are graphic representations of the waveforms of speech specimens produced by speech models and students.

Figure 6:
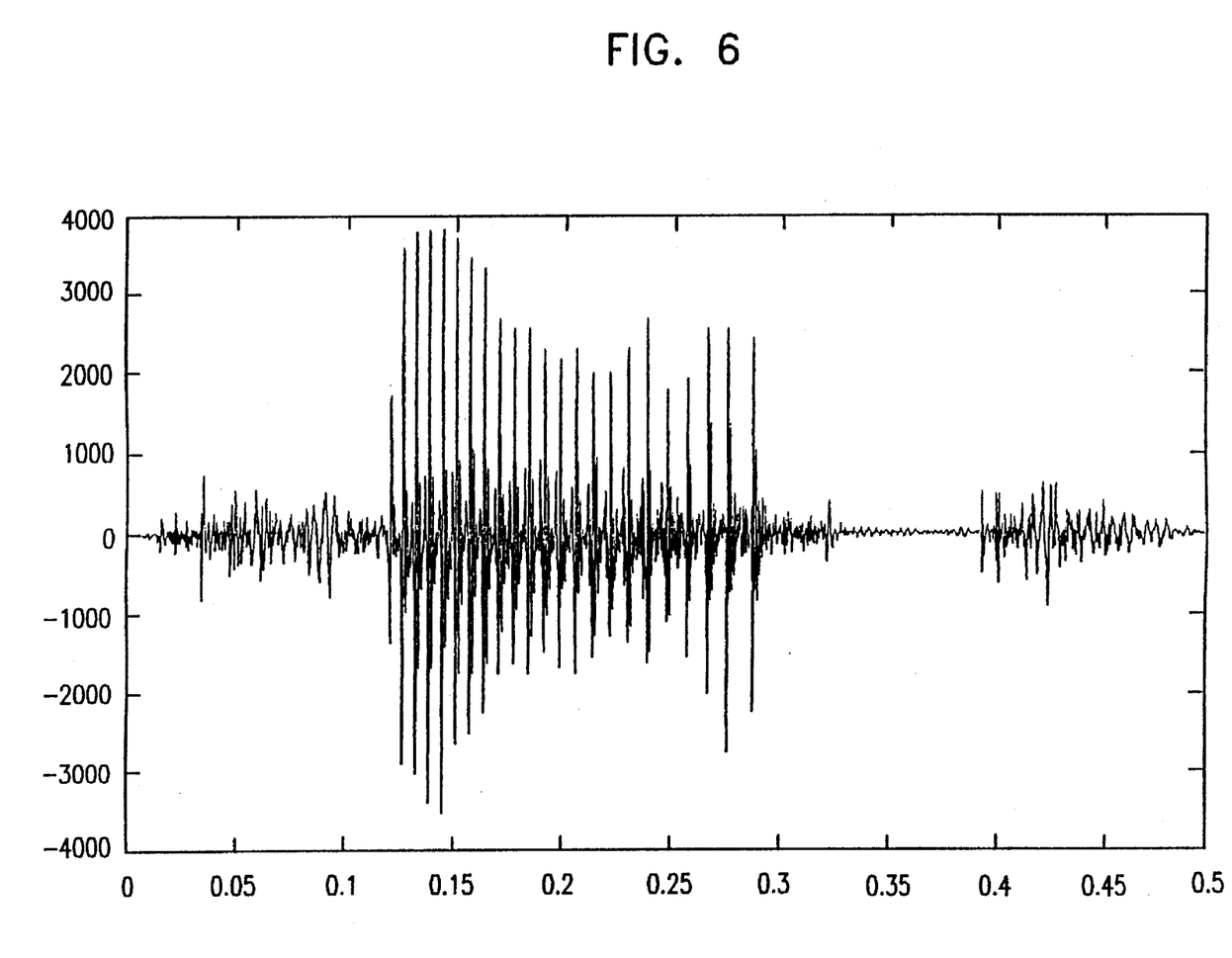
FIG. 6 is a graphic representation (audio amplitude vs. time in secs) of a speech model's rendition of the word "CAT" over 0.5 seconds.
Figure 7:
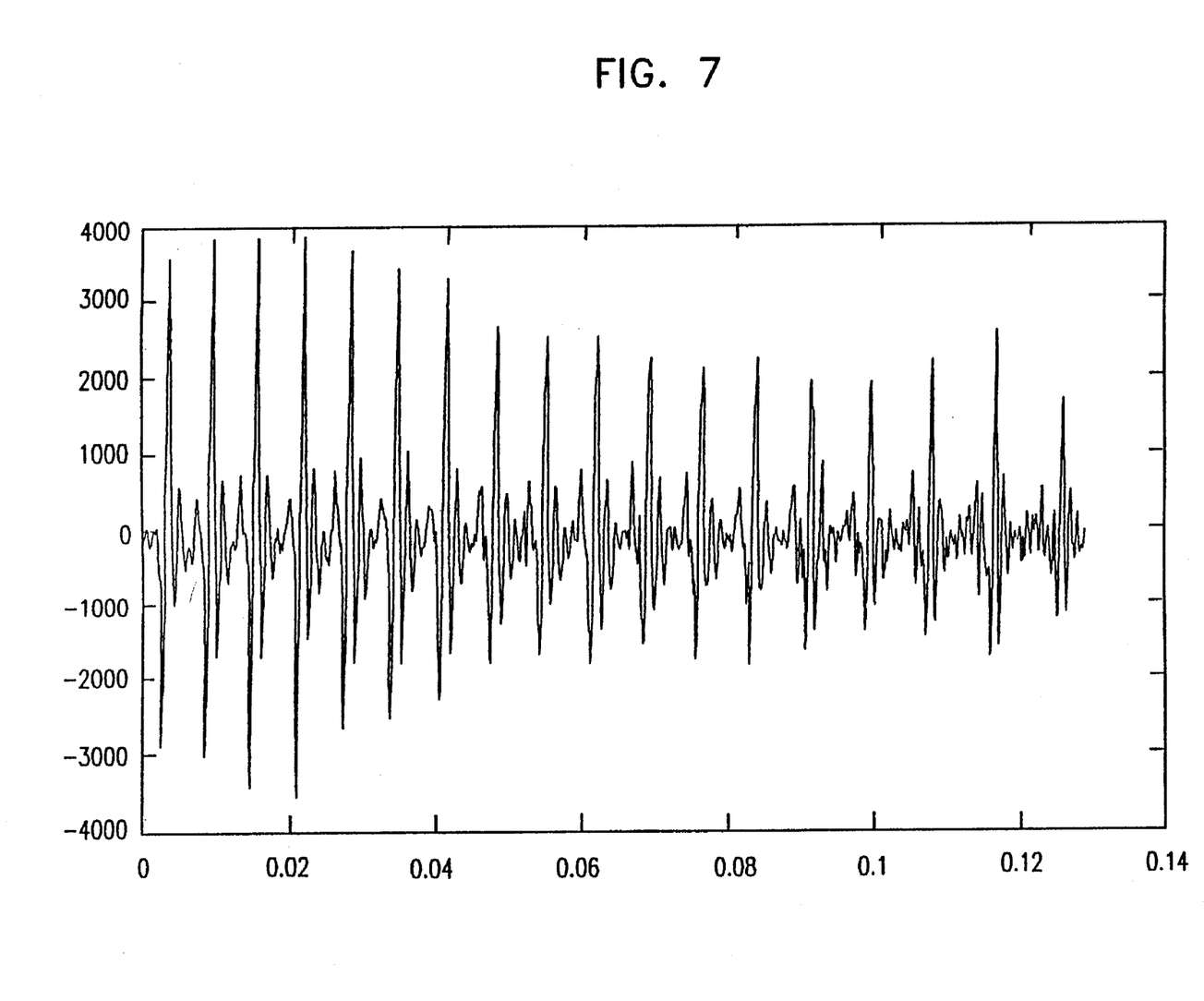
FIG. 7 is a graphic representation (audio amplitude vs. time in secs), derived from FIG. 6, of a speech model's rendition of the vowel "A" over 0.128 seconds.

FIG. 6 represents a speech model's rendition of the word "CAT" over 0.5 seconds. FIG. 7 is a graphic representation of a speech model's rendition of the vowel "A" over 0.128 seconds, obtained by "stripping" the consonants from the speech model's rendition of the word "CAT" illustrated in FIG. 6. The starting point of the vowel "A" is identified by finding the consonant-vowel boundaries in "CAT", as described above. According to one embodiment of the present invention, the duration of each vowel is predetermined. A predetermined vowel duration of 0.128 secs has been found to provide satisfactory results, however this value is not intended to be limiting.

According to another embodiment of the present invention, the duration of each vowel is not predetermined. Instead, vowel-consonant boundaries are identified by suitable analysis of the speech specimen.

Figure 8:
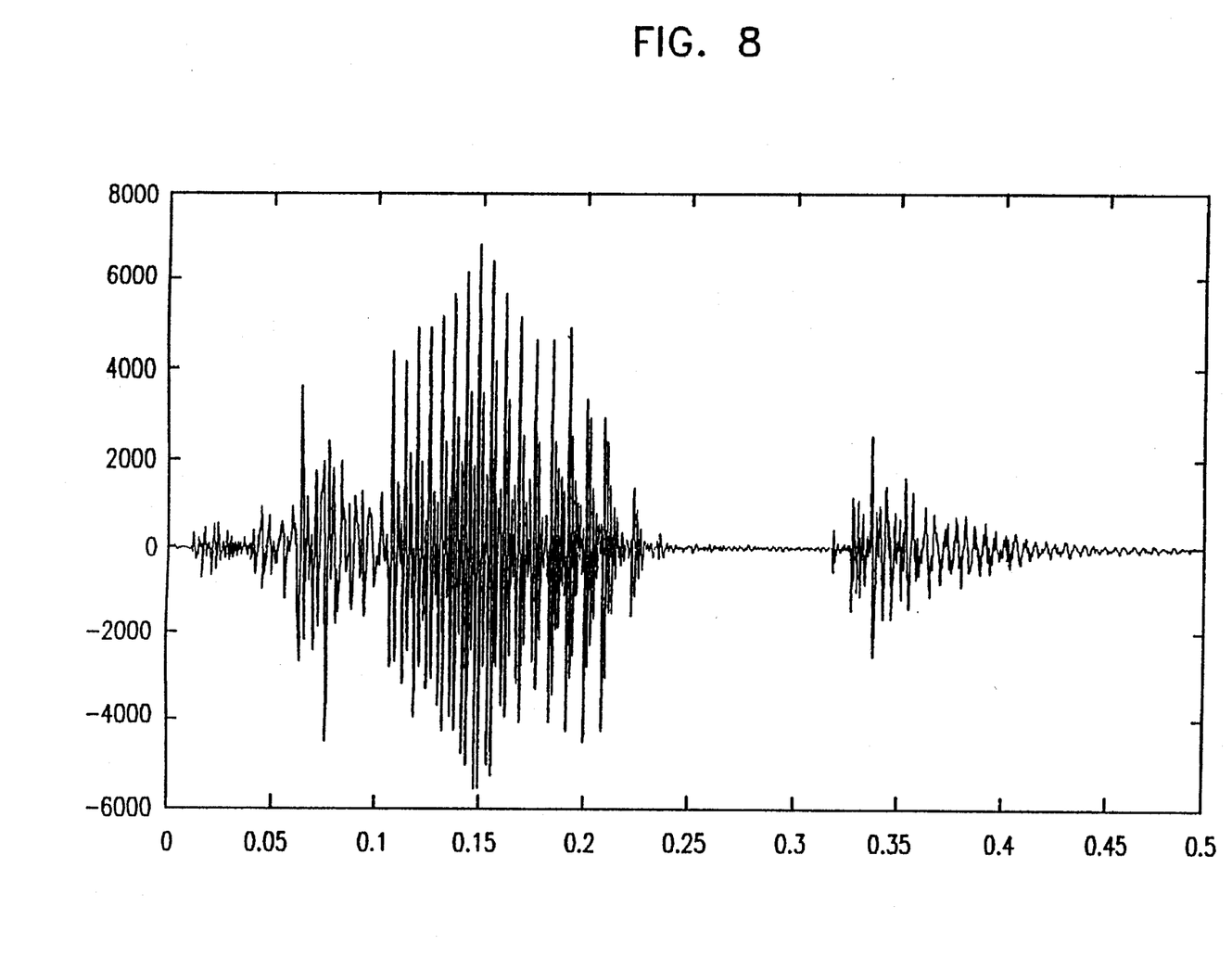
FIG. 8 is a graphic representation (audio amplitude vs. time in secs) of a student's attempted rendition of the word "CAT" over 0.5 seconds.
Figure 9:
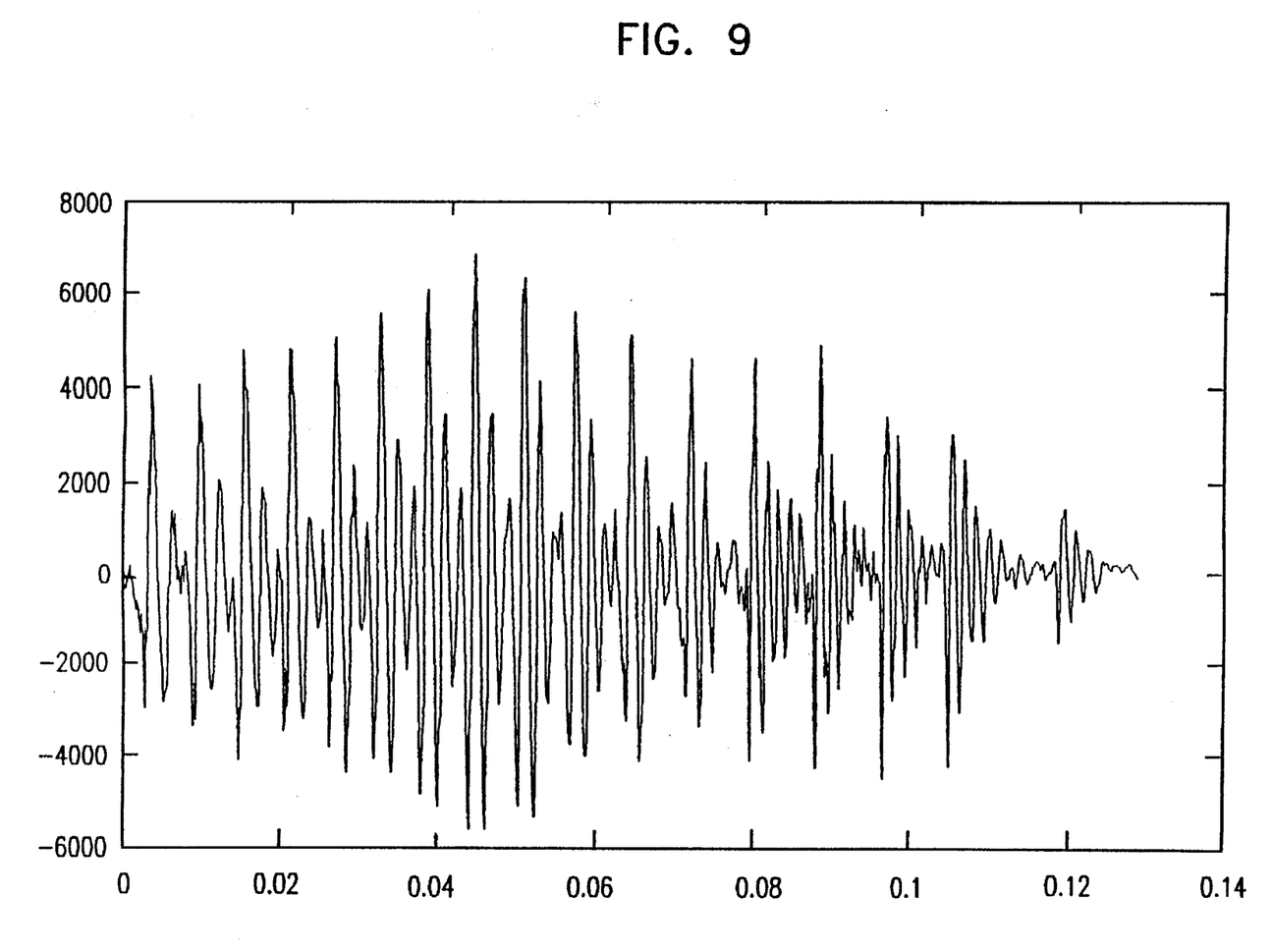
FIG. 9 is a graphic representation (audio amplitude vs. time in secs), derived from FIG. 8, of a student's attempted rendition of the vowel "A" over 0.128 seconds.

FIG. 8 is a graphic representation of a student's attempted rendition of the word "CAT" over 0.5 seconds. FIG. 9 is a graphic representation of a student's attempted rendition of the vowel "A" over 0.128 seconds, obtained by "stripping" the consonants from the student's rendition of the word "CAT" illustrated in FIG. 8.

Figure 10:
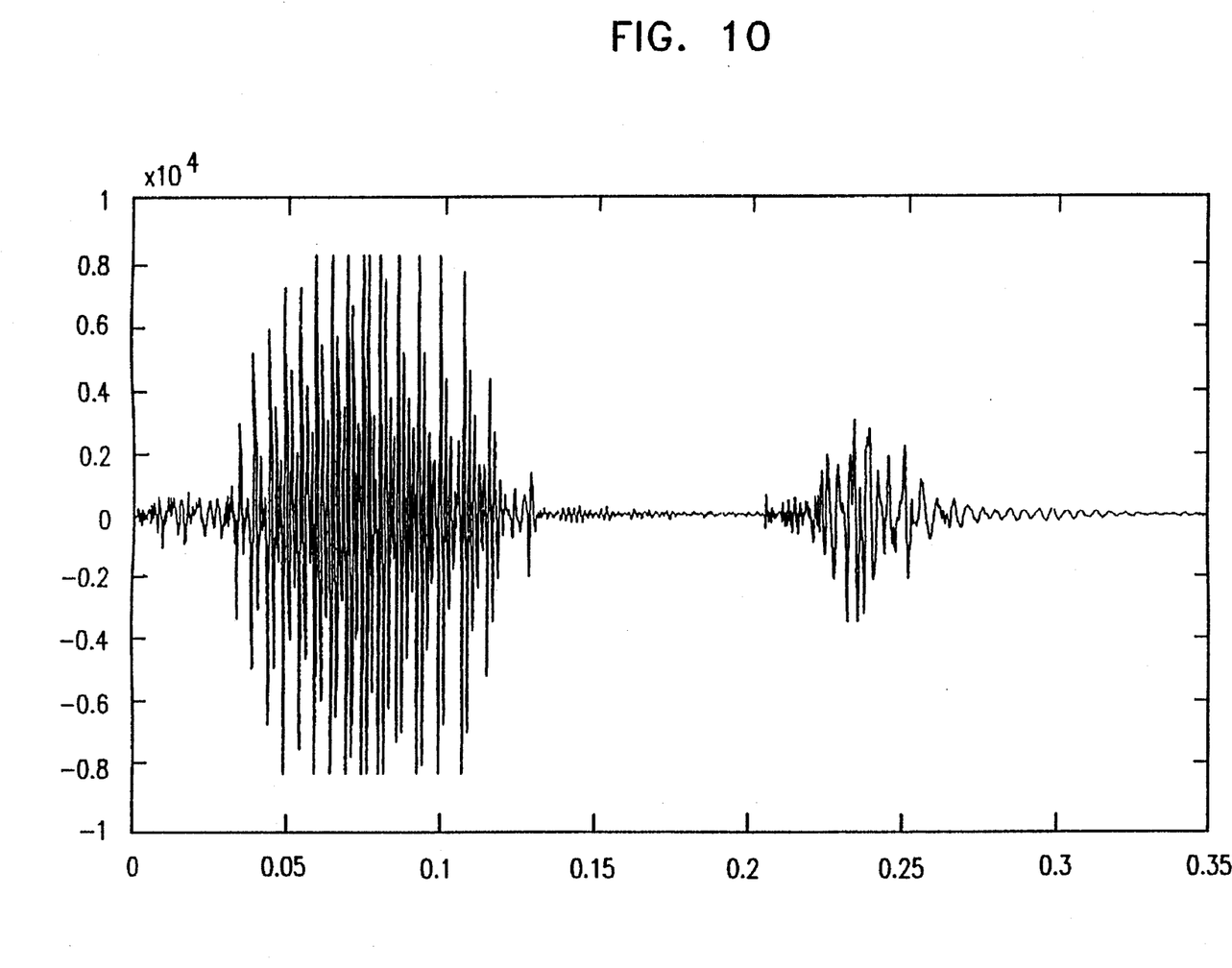
FIG. 10 is a graphic representation (audio amplitude vs. time in secs) of a student's attempted rendition of the word "CAT" over 0.35 seconds.
Figure 11:
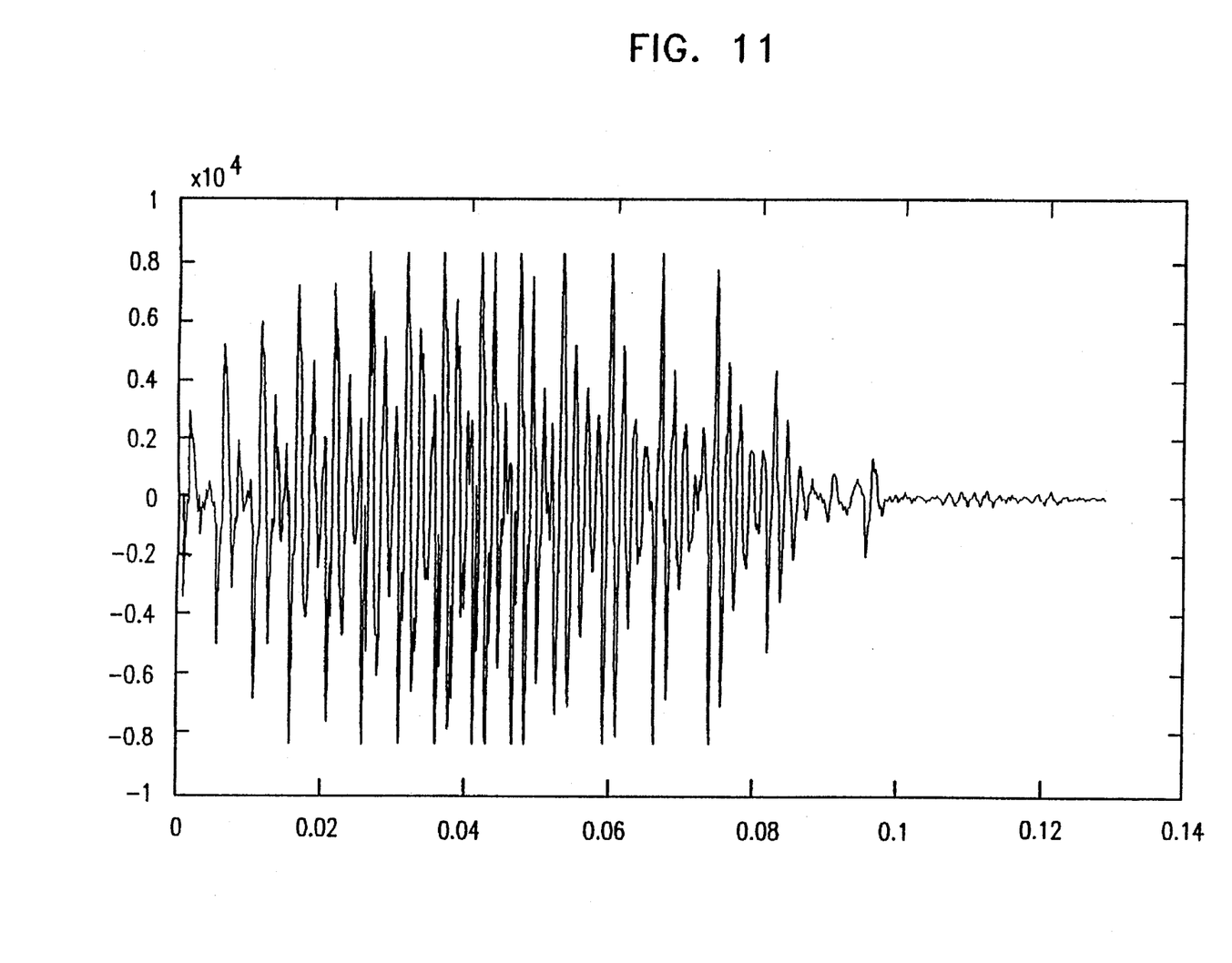
FIG. 11 is a graphic representation (audio amplitude vs. time in secs), derived from FIG. 10, of a student's attempted rendition of the vowel "A" over 0.128 seconds.

FIG. 10 is a graphic representation of a student's attempted rendition of the word "CAT" over 0.35 seconds. FIG. 11 is a graphic representation of a student's attempted rendition of the vowel "A" over 0.128 seconds, obtained by "stripping" the consonants from the student's rendition of the word "CAT" illustrated in FIG. 9.

It will be appreciated by persons skilled in the art that the present invention is not limited to what has been particularly shown and described hereinabove. Rather, the scope of the present invention is defined only by the claims that follow:

We claim:

1. Apparatus for interactive speech training comprising:
   an audio specimen generator for playing a pre-recorded reference audio specimen to a user for attempted repetition thereby;
   a reference audio specimen library in which reference audio specimens are stored and to which the audio specimen generator has access, wherein said audio specimen library comprises a multiplicity of recordings of speaker dependent audio specimens produced by a plurality of speech models;
   a speaker independent parameter database storing a plurality of speaker independent references which are different from the reference audio specimens stored in said reference audio specimen library; and
   an audio specimen scorer for scoring a user's repetition audio specimen by comparison of at least one parameter of the user's repetition audio specimen with a speaker independent reference, said speaker independent reference being characterized in that it is classified in a category according to at least one of age, gender and dialect categories.

2. Apparatus according to claim 1 wherein the audio specimen scorer comprises:
   a reference-to-response comparing unit for comparing at least one feature of a user's repetition audio specimen to at least one feature of the reference audio specimen; and
   a similarity indicator for providing an output indication of the degree of similarity between at least one repetition audio specimen feature and at least one reference audio specimen feature.

3. Apparatus according to claim 2 and also comprising a user response memory to which the reference-to-response comparing unit has access, for storing a user's repetition of a reference audio specimen.

4. Apparatus according to claim 2 wherein said reference-to-response comparing unit comprises a volume/duration normalizer for normalizing the volume and duration of the reference and repetition audio specimens.

5. Apparatus according to claim 2 wherein said reference-to-response comparing unit comprises a parameterization unit for extracting audio signal parameters from the reference and repetition audio specimens.

6. Apparatus according to claim 5 and wherein said reference-to-response comparing unit also comprises means for comparing the reference audio specimen parameters to the repetition audio specimen parameters.

7. Apparatus according to claim 6 wherein said means for comparing comprises a parameter score generator for providing a score representing the degree of similarity between the audio signal parameters of the reference and repetition audio specimens.

8. Apparatus according to claim 7 wherein said output indication comprises a display of said score.

9. Apparatus according to claim 2 wherein said output indication comprises a display of at least one audio waveform.

10. Apparatus according to claim 1 and also comprising a prompt sequencer operative to generate a sequence of prompts to a user.

11. Apparatus according to claim 1 wherein the plurality of speech models differ from one another in at least one of the following characteristics:
   sex;
   age; and
   dialect.

12. Apparatus according to claim 1 and also comprising a conventional personal computer.

13. Apparatus for interactive speech training comprising:
   a reference audio specimen database in which non-speaker independent reference audio specimens are stored;
   a speaker independent parameter database in which speaker independent references are stored;
   a prompt sequencer operative to generate a sequence of prompts including said reference audio specimens to a user, prompting the user to produce a corresponding sequence of audio specimens, wherein said sequence of prompts branches in response to user performance; and a reference-to-response comparing unit for comparing at least one feature of each of the sequence of audio specimens generated by the user, to a speaker independent reference from said speaker independent parameter database, said speaker independent reference being characterized in that it is classified in a category according to at least one of age, gender and dialect categories.

14. Apparatus according to claim 13 wherein the reference to which an individual user-generated audio specimen is compared comprises a corresponding stored reference audio specimen.

15. Apparatus according to claim 13 wherein the sequence of prompts is at least partly determined by a user's designation of his native language.

16. Apparatus according to claim 13 wherein the prompt sequencer comprises a multi-language prompt sequence library in which a plurality of prompt sequences in a plurality of languages is stored and wherein the prompt sequencer is operative to generate a sequence of prompts in an individual one of the plurality of languages in response to a user's designation of the individual language as his native language.

17. Apparatus for interactive speech training comprising:
a reference audio specimen database in which non-speaker independent reference audio Specimens are stored;
a speaker independent parameter database in which speaker independent references are stored;
a prompt sequencer operative to generate a sequence of prompts, including said non-speaker independent references, to a user, prompting the user to produce a corresponding sequence of audio specimens, wherein the sequence of prompts is at least partly determined by a user's designation of his native language; and
a speaker independent reference-to-response comparing unit for comparing at least one feature of each of the sequence of audio specimens generated by the user, to a speaker independent reference from said speaker independent parameter database, said speaker independent reference being characterized in that it is classified in a category according to at least one of age, gender and dialect categories.

18. Apparatus for interactive speech training comprising:
a reference audio specimen database in which non-speaker independent reference audio specimens are stored;
a speaker independent parameter database in which speaker independent references are stored:
apparatus for receiving and storing audio specimens generated by a user in response to reference audio specimens from said reference audio specimen database; and
a speaker independent reference-to-response comparing unit for comparing at least one feature of the audio specimen generated by the user, to a speaker independent reference from said speaker independent parameter database, said speaker independent reference being characterized in that it is classified in a category according to at least one of age, gender and dialect categories, the comparing unit comprising:
an audio specimen segmenter for segmenting a user-generated audio specimen into a plurality of segments; and
a segment comparing unit for comparing at least one feature of at least one of the plurality of segments to a speaker independent reference from said speaker independent parameter database.

19. Apparatus according to claim 18 wherein said audio specimen segmenter comprises a phonetic segmenter for segmenting a user-generated audio specimen into a plurality of phonetic segments.

20. Apparatus according to claim 19 wherein at least one of the phonetic segments comprises a phoneme.

21. Apparatus according to claim 19 wherein at least one of the phonetic segments comprises a syllable.

22. Apparatus according to claim 20 wherein the phoneme comprises a vowel.

23. Apparatus according to claim 20 wherein the phoneme comprises a consonant.

24. Apparatus for interactive speech training comprising:
a reference audio specimen database in which non-speaker independent reference audio specimens are stored;
a speaker independent parameter database in which speaker independent references are stored:
an audio specimen recorder for recording audio specimens generated by a user in response to reference audio specimens from said reference audio specimen database; and
a speaker-independent audio specimen scorer for scoring a user-generated audio specimen based on at least one speaker-independent reference parameter from said speaker independent parameter database, said speaker independent reference parameter being characterized in that it is classified in a category according to at least one of age, gender and dialect categories.

25. Apparatus according to claim 24 wherein at least one speaker-independent parameter comprises a threshold value for the amount of energy at a predetermined frequency.

26. Apparatus for interactive speech training comprising:
a reference audio specimen database in which non-speaker independent reference audio specimens are stored;
a speaker independent parameter database in which speaker independent references are stored;
apparatus for receiving and storing audio specimens generated by a user in response to reference audio specimens from said reference audio specimen database; and
a speaker independent reference-to-response comparing unit for comparing at least one feature of the audio specimens generated by the user, to a speaker independent reference from said speaker independent parameter database, said speaker independent reference being characterized in that it is classified in a category according to at least one of age, gender and dialect categories.

* * * * *